United States Patent Office 3,770,621
Patented Nov. 6, 1973

3,770,621
HYDROCARBON SEPARATION USING A SELECTIVE ADSORPTION PROCESS WITH PURGE GAS CONSERVATION
John J. Collins, Katonah, and Raymond A. Reber, Montrose, N.Y., assignors to Union Carbide Corporation, New York, N.Y.
Filed Dec. 22, 1971, Ser. No. 210,792
Int. Cl. C07c 7/12
U.S. Cl. 208—310                           3 Claims

ABSTRACT OF THE DISCLOSURE

Normal paraffins are separated from mixtures thereof with non-normal hydrocarbons in a vapor phase, iso-thermal, isobaric, non-sorbable purge process in which three or more fixed bed molecular sieve adsorbers are operated so that as each adsorber undergoes its adsorption-fill step which displaces the purge gas, another receives that purge gas to displace its void space hydrocarbon vapors, or to assist in purge desorption.

---

Figure 1:
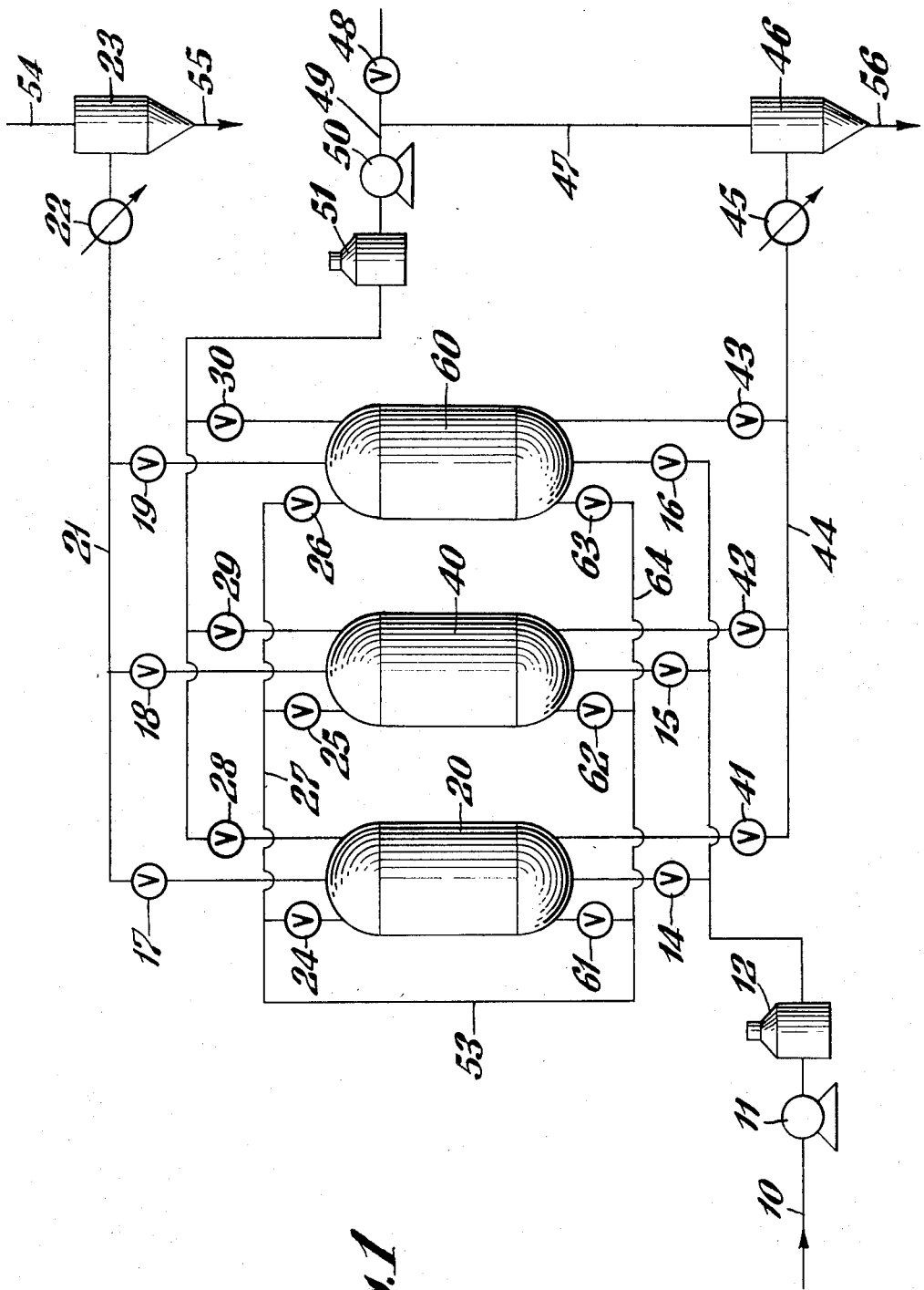

The present invention relates in general to a process for separating mixtures of straight chain hydrocarbons from admixture with branched chain hydrocarbons based on size selective adsorption of the former using zeolitic molecular sieve adsorbents. More particularly, the invention relates to an improved hydrocarbon separation process of the aforesaid type wherein measures are taken to conserve the purge gas used to desorb the selectively adsorbed hydrocarbons for product collection.

The separation of mixtures of chemical compounds into two or more fractions based on molecular size has become a conventional process since a variety of synthetic zeolitic molecular sieves have been made commercially available. The uniformity of diameter of the pores of a given zeolite molecular sieve species and the variety of pore diameters ranging from about 3 to about 11 angstroms among the various zeolite species have permitted bulk separations of the components of petroleum-derived feedstocks to be made where formerly such separations by fractional distillation were economically unattractive, or virtually impossible.

Many processes for molecular sieve separation of non-straight chain hydrocarbons from straight chain hydrocarbons have been proposed and some have been successfully commercialized. Most have been based on contacting the mixed hydrocarbon feed in the vapor phase with a 5A molecular sieve to adsorb the straight chain hydrocarbon compounds followed by desorption of the straight chain compounds at a lower pressure or higher temperature usually with the aid of a purge gas. Some have been done with little or no change in temperature or pressure by employing a purge which is sufficiently strongly adsorbed to exert a displacing action on the adsorbed straight chain compounds.

Conducting the process isothermally and isobarically with an essentially non-sorbable, non-condensible purge gas to effect desorption has also heretofore been proposed. Such a process is described in copending application Ser. No. 71,895, filed Sept. 14, 1970 by Martin F. Symoniak et al. and utilizes an integrated two stage countercurrent void space flushing procedure.

It has now been discovered, however, that such a separation process can be operated isobarically and isothermally using a non-sorbable purge gas in a co-current direction into the adsorption bed as part of the overall desorption procedure without adverse effect upon product purity and with attendant simplification of the process apparatus.

In accordance with the present invention, there is provided a process for separating normal paraffins from admixture with non-normal hydrocarbons which comprises passing the mixture as a feedstock in the vapor phase into one end of a first fixed bed of particles comprising a zeolitic molecular sieve adsorbent having an effective pore diameter of about, i.e., substantially, 5 angstroms and having adsorbed thereon a quantity of normal paraffin molecules, and said first bed containing a non-sorbable purge gas in its void space at substantially the same temperature and pressure as the incoming feedstock, said feedstock being passed into said first bed for a period of time sufficient to force the non-sorbable purge gas from the other end of said first bed and to adsorb normal paraffins on the molecular sieve therein; terminating the passage of feedstock into said bed prior to the time the stoichiometric point of the mass transfer zone of the lowest molecular weight normal paraffin sought to be isolated from the feedstock has moved through 85 percent of the bed length; isobarically and isothermally passing the non-sorbable purge gas forced from the first bed by the incoming feedstock thereto to at least one of a second and a third fixed bed, both of which have essentially the same adsorption capacity and void space as said first bed and contain particles comprising a zeolitic molecular sieve adsorbent having an effective pore diameter of substantially 5 angstroms and each of which contains a greater quantity than said first bed of adsorbed normal paraffin molecules from the feedstock at the time passage of said non-sorbable purge gas from said first bed is initiated; concurrently purging non-normal hydrocarbons from the first bed void space with a non-sorbable purge gas; and desorbing at least some of the adsorbed normal paraffins from the first bed and recovering same.

It will be apparent from the foregoing to those skilled in the art that the adsorption system utilized in the practice of the present invention must comprise at least three adsorbent beds of equal size, but that a greater number of beds can be utilized.

In this process, the condition of an adsorption bed at the end of its desorption stroke is that its void space contains purge gas at process temperature and pressure. This adsorber volume of gas is displaced as an effluent during the adsorption-fill phase of the adsorption step and if allowed to pass through a product collection system becomes a heat-load in a recycle system. Usually it is a periodic rather than a steady load in the thermal and pressure equipment requiring that such equipment be properly sized to handle the periodic peak loads. During the adsorption-fill period, the normal paraffins are adsorbed in the fixed bed of adsorbent and a normals adsorption mass transfer zone advances toward the other end of the bed. The unadsorbed non-normal hydrocarbons of the feedstock pass into the bed void space beyond the adsorption mass transfer zone and push the non-sorbable purge gas, initially occupying that void space, out the other end of the bed without substantial mixing of the two gas bodies, i.e., plug flow is employed. The present process utilizes this one adsorber volume of purge gas as a void space displacing purge in another adsorber which is in the step of void purge at the same period of time that the one adsorber is releasing its purge, or this same volume of purge gas can serve as a portion of the total requirement of non-sorbable gas used to desorb the that time undergoing that stage of the desorption procedure.

The molecular sieve adsorbent can be any of the naturally occurring or synthetically-produced, three-dimensional crystalline zeolitic aluminosilicates from which the water of hydration can be removed without collapse of the crystal lattice and which will selectively, on the basis of molecular size, adsorb normal paraffins from the mixture thereof with branched chain and/or cyclic paraffins which comprises the feed stream. Since normal paraffins have a minimum cross-sectional diameter of about 5 angstroms, molecular sieves having pore diameters of about 5 angstroms are preferred for the practice of the present process. Especially suitable are the cation forms of zeolite A which have pore diameters of about 5 angstroms. Zeolite A is well known in the art as a synthesized zeolite having a very large adsorption capacity and, depending on the cation species present, exhibits apparent pore diameters ranging from about 3 to about 5 angstroms. As prepared in the sodium cation form, zeolite A has pore diameters of about 4 angstroms. When 25 percent, preferably at least 40 percent, of the sodium cations are exchanged by calcium and/or magnesium cations, the effective pore diameter increases to about 5 angstroms. Zeolite A as used herein in the specification and claims is intended to denote the zeolite described and defined in U.S. Pat. 2,882,243. Other zeolitic molecular sieves which, in appropriate cation forms, have pore diameters of about 5 angstroms and which, although having less adsorption capacity than zeolite A, are suitably employed include zeolite T, U.S. Pat. 2,950,952 and the minerals chabazite and erionite.

The hydrocarbon streams treated in accordance with the present invention consist essentially of mixtures of branched chain paraffins and normal paraffins boiling in the gasoline and kerosene ranges. Such mixtures occur as petroleum naphthas, both light and heavy, natural gasolines and natural gas condensates, but can be the products of processes outside the petroleum production and refining industry. In general, the hydrocarbons of these streams contain from about 4 to about 13 carbon atoms and preferably are substantially free of olefinically and acetylenically unsaturated species. It is also advantageous that sulfur compound impurities, if present, be present in a concentration less than about 400 parts per million, and that $H_2O$ impurity levels be below saturation. Although the process is operable regardless of the relative molar proportions of normals to non-normals present in the feed, the greatest benefit is afforded when the process is operated as one of bulk separation wherein both non-paraffins and normal paraffins each constitute at least 10 mole percent of the feedstock.

The entire process is operated at a substantially uniform temperature selected from the range of about 350° F. to 750° F. At temperatures below about 350° F., the efficiency of the non-sorbable purge gas is decreased to the point where undesirably large quantities are required adequately to purge the normals from the bed. Above about 750° F., the rate of coke deposition increases rapidly and the need for more frequent oxidative regenerations of the adsorbent arises. It is to be understood that the denomination of the present process as being "isothermal" is done so for the reason that the temperature of the feed and purge gas stream are essentially the same, i.e., within about 30° F. when entering the bed. In this, as in any adsorption-desorption cycle, it is possible for thermal gradients to develop in the bed due to heats of adsorption and desorption.

The pressure range suitable for the present process is not critical with respect to its lower limit, but is critical with respect to its upper limit. Since the process is carried out with the fluid streams being in the vapor state, atmospheric or even subatmospheric pressures are helpful in this regard. Any advantage arising from low process pressures is, however, more than balanced by the disadvantage of the necessity for the installation, maintenance and operation of vacuum equipment to accomplish fluid flow through the system. Acccordingly, it is advantageous that the pressure be at least greater than atmospheric, with at least about 30 p.s.i.a. being preferred. The upper limit of pressure is dependent upon the temperature of the system and the composition of the feed. It is highly advantageous that none of the feed stream components condense in the void space of the bed since such liquid phase material is removed only with a relatively large quantity of non-sorbable purge gas. Accordingly, the pressure is preferably maintained at less than 80 percent of the critical pressure of the highest boiling key component of the feed or less than about 60 percent of the dew point pressure of the feed at the process temperature, whichever is the lower value. Similarly, as in the case of the term "isothermal" supra, the process is termed "isobaric" because the pressure of the adsorber feed and purge gas streams are within conventional limits the same at their respective influent ends of the bed. The term "isobaric" is thus used in its accepted sense in the art to indicate that the present process does not utilize a pressure swing type of desorption. By the term "key component" used herein in conjunction with the delineation of pressure requirements is meant any paraffinic constituent of the feed mixture which is present in significant amount. As is well understood in the art, what constitutes a significant quantity of a particular component of a mixture depends somewhat on the other components present and the nature of the treatment the feed is undergoing. Generally, however, in the present process, a key component will be present in an amount of about 10 mole percent or greater.

When the pressure conditions are dictated by the dew point criterion, the dew point of the hydrocarbon mixture involved can be determined by the procedure set forth in "Process Heat Transfer," Kern, Donald Q., McGraw-Hill Book Company, New York, N.Y. (U.S.A.) at pp. 319–325 inclusive. Other procedures are well known in the art to make these calculations. Routine experimentation can of course be resorted to instead of calculating the dew point.

The non-sorbable purge gas used to purge the bed void space vapors and carry from the bed desorbed normal paraffins in this process is any permanent gas or mixture of such gases which have molecular dimensions sufficiently small to enter the intracrystalline cavities of the molecular sieve, but are not themselves strongly enough adsorbed to displace the normal hydrocarbons adsorbed thereon to any significant degree. Nitrogen, hydrogen, helium and methane are such materials and are preferred in the practice of this invention. Other permanent gases are known in the art, but lack of commercial availability at reasonable cost renders them impractical although operable.

Bed void space for purposes of this invention is intended to mean any space in the bed not occupied by solid material except the intracrystalline cavities of the zeolite crystals. The pores within any binder material which may be used to form agglomerates of the zeolite crystals is considered to be bed void space.

As stated hereinbefore, the adsorption stroke wherein the normal paraffins are selectively adsorbed on the bed is continued for a period no longer than that which causes the stoichiometric point of the normal hydrocarbons mass transfer zone has moved through about 85 percent of the bed length. The term mass transfer zone as used herein has the same meaning as is generally accepted in the art, i.e., it denotes that section of the adsorbent bed in which the adsorbate loading of the adsorbent bed and the concentration of the adsorbate fraction in the fluid stream are both increasing with time. The "stoichiometric point" lies within the mass transfer zone and is that point at which the expended capacity of the leading section of the mass transfer zone is equal to the unexpended capacity of the transfer zone.

In a preferred embodiment of the present invention, three adsorption beds are used and the single bed volume of residual non-sorbable purge gas from one newly desorbed bed is passed directly and cocurrently into another bed which has just completed its adsorption stroke. Such a process is illustrated, with reference to the flow diagram which is FIG. 1 of the drawings, in the following example:

EXAMPLE 1

A full range gasoline having a boiling range of 40° C. to 180° C. containing 64% normal paraffins, 31% branched chain paraffins, 4% naphthenic and 1% aromatic hydrocarbons, all in volume percent, is fed through line 10 to pump 11 which discharges at 260 p.s.i.g. to heater 12 raising the temperature to 700° F., thence into feed manifold 13 and through valve 14, thence to the feed inlet end of adsorber 20 containing a fixed bed of 1/16" diameter pellets of zeolitic molecular sieve Type 5A having effective pore openings of about 5 angstrom units. Adsorbers 40 and 60 similarly contain fixed beds of such Type 5A molecualr sieve. The opening of valve 14 to pass the compressed heated hydrocarbon vapor initiates the adsorption-fill step of the process at which point the adsorber contains nitrogen gas at the selected isothermal temperature and isobaric pressure of the process. As the feed hydrocarbon vapors enter the adsorber, the nitrogen gas exits the other end of the adsorber through valve 24 into manifold conduit 27, thence through conduit 53 into manifold conduit 64 for passage into another adsorber simultaneously undergoing the co-purge step of the process. Valve 62 is open and adsorber 40 is being simultaneously co-purged. At this point, it should be understood that while adsorber 20 is in the step of adsorption-fill, adsorber 40 is simultaneously in the step of co-purge and adsorber 60 is in the step of counter-current purge desorption and that each of the adsorbers sequentially undergoes the steps of adsorption-fill, co-purge and countercurrent purge desorption. It will, thus suffice to describe the process cycle by describing the sequence of the steps in adsorber 20. As the feed hydrocarbon vapor passes into adsorber 20 the normal paraffins are adsorbed by the molecular sieve and a mass transfer adsorption front advances in the fixed bed. The non-sorbed non-normal hydrocarbon vapors pass into the void spaces in the adsorber ahead of the adsorption front and the nitrogen gas previously resident therein is displaced by the non-normal hydrocarbon vapor. The adsorption-fill step is continued until the one-bed volume of nitrogen has exited through valve 24 at which point valves 14 and 24 are closed and valves 61 and 17 are opened for the co-purge step. The condition in adsorber 20 at this point is that the normal hydrocarbon adsorption front has reached a point of 60% utilization of the fixed bed of molecular sieve therein. The void space in that region of the adsorber from the inlet end to the point of utilization contains hydrocarbon vapors of essentially the feed composition while the void space ahead of the adsorption front contains the normal paraffin depleted non-normal hydrocarbon vapors. Now with valves 61 and 17 open nitrogen gas from manifold conduit 64 enters adsorber 20 and non-normal hydrocarbon vapors exit the other end through valve 17 passing through conduit 21 are cooled in heat exchanger 22 and separated from any entrained, non-condensible gas in collector 23 from which non-normals hydrocarbon product is withdrawn through line 55 and gas is withdrawn from line 54. During the course of the co-purge step substantially one bed volume of nitrogen gas enters the adsorber effecting a forward displacement of the hydrocarbons in the voids. The normal paraffin hydrocarbons in the hydrocarbon vapor which are displaced in a co-current direction are adsorbed by the molecular sieve with a further forward advance of the normals adsorption zone to a point of 95 percent utilization of the fixed bed of molecular sieve and the normals depleted, non-normal hydrocarbon vapor is displaced co-currently from the adsorber. Adsorber 20 has now completed the co-purge step and valves 61 and 17 are closed. Now valves 28 and 41 are opened for the countercurrent purge desorption step. Recycle nitrogen gas from separator 46 passes through conduit 47 into conduit 49 where it is mixed with added nitrogen gas fed in valve 48, as required, passes into desorption purge gas recycle blower 50, is heated in heater 51 to the isothermal process temperature and thence into manifold conduit 52 through open valve 28 into and through adsorber 20 in a countercurrent direction, through open valve 28 into and through adsorber 20 in a countercurrent direction, through open valve 41 into manifold conduit 44 through cooler 45 to separator 46. As the purge gas passes through the fixed bed of molecular sieve in adsorber 20 the adsorbed normal paraffins therein are at least partially desorbed therefrom and purged therefrom as a vapor mixture with the nitrogen gas stream from which they are condensed and collected in cooler 45 and separator 46. The product normal hydrocarbons are withdrawn through line 56.

EXAMPLE 2

This example shows the manner of using the FIG. 1 apparatus to separate normal paraffins from mixtures with non-normal hydrocarbons using a feedstock which is lower in normal paraffin content than that used in Example 1. Since the feed is lower in normal paraffins, the loading of the molecular sieve is less at the end of the adsorption-fill step than in Example 1 and it is desired to attain a higher loading by including an adsoprtion flow-through step. Thus, in this example a complete cycle for each adsorber consists of the steps: adsorption-fill, adsorption flow-through, co-purge and countercurrent purge desorption. The following chart shows the time relationship of four steps in the three adsorbers for the 12 minute total cycle of this example:

|  | Time in minutes | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Adsorber: | | | | | | | | | | | | |
| 20 | ← A → | | ← B → | | ← C → | | ← | | | D | | → |
| 60 | ← | | → D | | → | ← A → | | ← B → | | ← C → | | ← D → |
| 40 | ← C → | | ← | | | D | | → | | ← A → | | ← B → |

Step.—A=Adsorption-Fill; B=Adsorption Flow-Through; C=Co-Purge (co-current purge); D=Countercurrent Purge Desorption.

As shown in the chart, there are periods of time when there are two adsorbers undergoing purge desorption, namely the 3–4, 7–8 and 11–12 minute periods and when there is only one adsorber desorbing, namely the 1–2, 5–6 and 9–10 minute periods. Advantageously, when two adsorbers are desorbing the purge flow can be controlled in those two adsorbers during that period so that the effluent stream of purge gas and normal paraffin vapor does not vary greatly in flow rate and composition. This can be desirable in regard to the design of the normals product separation system or in those instances where the purge gas-normal paraffin stream is passed directly to another process unit, for example a catalytic isomerization reactor. The feed of this example is a mixture of normal paraffins and non-normal hydrocarbons, principally pentanes and hexanes, such as might be obtained by the catalytic isomerization of a pentane-hexane mixture. It contains 25% normal paraffins and 75% non-normal hydrocarbons. The feed enters line 10, is pressurized to 260 p.s.i.g. in pump 11 and heated to 700° F. in heater 12 and passed to feed manifold 13, thence through valve 14 to the feed inlet end of adsorber 20 which contains a fixed bed of 1/16" diameter pellets of zeolitic molecular sieve having 5A pores. Adsorbers 40 and 60 similarly contain fixed beds of such Type 5A molecular sieve. The opening of valve 14 to pass the compressed, heated, hydrocarbon vapor initiates the adsorption-fill step of the process at which point the adsorber contains hydrogen gas at the selected isothermal temperature and isobaric pressure of the process. As the feed hydrocarbon vapors enter the adsorber the hydrogen gas exits the other end of the adsorber through valve 24 into manifold conduit 27, thence through conduit 53 into manifold conduit 64 for passage into another adsorber simultaneously undergoing the co-purge step of the process. Valve 62 is open and adsorber 40 is being simultaneously co-purged. At this point, it should be understood that while adsorber 20 is in the step of adsorption-fill, adsorber 40 is simultaneously in the step of co-purge and adsorber 60 is in the step of countercurrent purge desorption and that each of the adsorbers sequentially undergoes the steps of adsorption-fill, adsorption flow-through, co-purge and countercurrent purge desorption flow-through, co-purge and countercurrent purge desorption. With this understanding, it will suffice to describe the process cycle by describing the sequence of the steps in adsorber 20. As the feed hydrocarbon vapor passes into adsorber 20 the normal paraffins are adsorbed by the molecular sieve and a mass transfer adsorption front advances in the fixed bed. The non-sorbed non-normal hydrocarbon vapors pass into the void spaces in the adsorber ahead of the adsorption front and the hydrogen gas previously resident therein is displaced by the non-normal hydrocarbon vapor. The adsorption-fill step is continued until the one-bed volume of hydrogen has exited through valve 24 at which point valve 24 is closed and valve 17 is opened for the adsorption flow-through step. The condition in adsorber 20 at this point is that the normal hydrocarbon adsorption zone has reached a point of 22% utilization of the fixed bed of molecular sieve therein. The void space in that region of the adsorber from the inlet end to the point of utilization contains hydrocarbon vapors of essentially the feed composition while the void space ahead of the adsorption front contains the normal paraffin depleted non-normal hydrocarbon vapors. Now with valves 14 and 17 open feed vapor from manifold conduit 13 enters adsorber 20 and non-normal hydrocarbon vapors exit the other end through valve 17 passing through conduit 21, are cooled in heat exchanger 22 and separated from any entrained, non-condensible gas in collector 23 from which non-normals hydrocarbon product is withdrawn through line 55 and gas is withdrawn from line 54. During this step the normals adsorption front advances to 78% utilization of the bed leaving sufficient unused bed to adsorb the normal paraffins from the void space vapor during the following co-purge step. Valve 14 is closed and valve 61 opened and substantially one bed volume of hydrogen gas enters the adsorber effecting a forward displacement of the hydrocarbons in the voids. The normal paraffin hydrocarbons in the hydrocarbon vapor which is displaced in a co-current direction are adsorbed by the molecular sieve with a further forward advance of the normals adsorption front to a point of 95 percent utilization of the fixed bed of molecular sieve and the normals depleted, non-normal hydrocarbon vapor is displaced co-currently from the adsorber. Adsorber 20 has now completed the co-purge step and valves 61 and 17 are closed. Now valves 28 and 41 are opened for the countercurrent purge desorption step. Recycle hydrogen gas from separator 46 passes through conduit 47 into conduit 49 where it is mixed with added hydrogen gas fed in valve 48, as required, passes into desorption purge gas recycle blower 50, is heated in heater 51 to the isothermal process temperature and thence into manifold conduit 52 through open valve 28 into and through adsorber 20 in a countercurrent direction, through open valve 41 into manifold conduit 44 through cooler 45 to separator 46. As the purge gas passes through the fixed bed of molecular sieve in adsorber 20 the adsorbed normal paraffins therein are at least partially desorbed therefrom and purged therefrom as a vapor mixture with the hydrogen gas stream from which they are condensed and collected in cooler 45 and separator 46. The product normal hydrocarbons are withdrawn through line 56.

Figure 2:
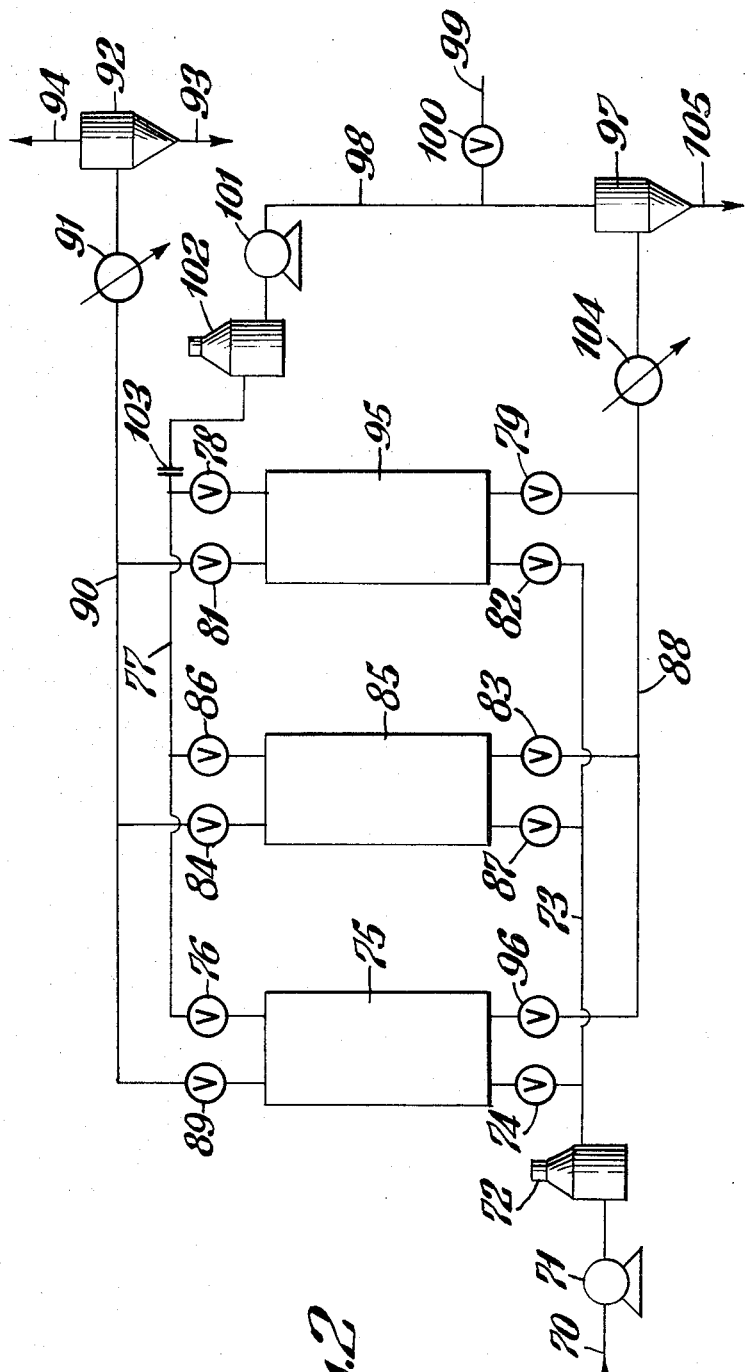

In another preferred embodiment of the process of this invention, the valve operations are programmed so that the bed volume of non-sorbable purge gas which is displaced from the adsorber which is on the adsorption-fill step is used as non-sorbable purge in the adsorber which is on the countercurrent purge desorption step while at the same time a bed volume of purge effluent from that latter adsorber is used for the co-purge step in the third adsorber. This preferred method has the benefit that the bed volume of purge which enters the adsorber on the co-purge step contains normal hydrocarbon vapor with the result that the first bed volume of gas exiting that latter adsorber where the succeeding countercurrent purge desorption step is begun has an appreciable content of normal hydrocarbons admixed with the non-sorbable purge gas. This is desirable for smooth operation of the equipment to which the desorption stream passes which in this example are heat exchangers and normal paraffin product collection apparatus. Such a process is illustrated, with reference to the flow diagram which is FIG. 2 of the drawings, in Example 3 below.

EXAMPLE 3

The feed, a mixture of pentanes and hexanes as in Example 2 enters line 70, is pressurized to 260 p.s.i.g. in pump 71, heated to 700° F. in heater 72 and passes to feed manifold 73, thence through valve 74 to the feed inlet end of adsorber 5 which contains a fixed bed of 1/16″ pellets of 5A molecular sieve. The opening of valve 74 to pass the compressed, heated, hydrocarbon vapor initiates the adsorption-fill step of the process at which point the adsorber contains hydrogen gas at the selected isothermal temperature and isobaric pressure of the process. As the feed hydrocarbon vapors enter the adsorber 75 the hydrogen gas exits the other end of the adsorber through valve 76 into manifold conduit 77. While adsorber 75 is on the adsorption-fill step, adsorber 95 is in the step of countercurrent purge desorption with valves 78 and 79 open and valves 81 and 82 closed, and adsorber 85 is on the step of co-purge with valves 83 and 84 open and valves 86 and 87 closed. Thus, the bed volume of hydrogen passing from adsorber 75 into manifold 77 flows into adsorber 95 while a bed volume of purge effluent from adsorber 95 passing through open valve 79 into manifold conduit 88 passes into adsorber 85 through open valve 83. At this point it is understood that while adsorber 75 is in the step of adsorption-fill, adsorber 85 is simultaneously in the step of co-purge and adsorber 95 is in the step of countercurrent purge desorption and that each of the adsorbers sequentially undergoes the steps of adsorption-fill, adsorption flow-through, co-purge and countercurrent purge desorption. With this understanding, it will suffice to describe the process cycle by describing the sequence of the steps in adsorber 75. As the feed hydrocarbon vapor passes into adsorber 75, the normal paraffins are adsorbed by the molecular sieve and a mass transfer adsorption front advances in the fixed bed. The non-sorbed non-normal hydrocarbon vapors pass into the void spaces in the adsorber ahead of the adsorption front and the hydrogen gas previously resident therein is displaced by the non-normal hydrocarbon vapor. The adsorption-fill step is continued until the one-bed volume of hydrogen has exited through valve 76 at which point valve 76 is closed and valve 89 is opened for the adsorption flow-through step. As these valve changes are made, valves 83 and 84 are closed and valves 87 and 86 are opened terminating the co-purge and starting the countercurrent purge desorption steps in adsorber 85. The condition in adsorber 75 at this point is that the normal hydrocarbon adsorption zone has reached a point of 22% utilization of the fixed bed of molecular sieve therein.

The void space in that region of the adsorber from the inlet end to the point of utilization contains hydrocarbon vapors of essentially the feed composition while the void space ahead of the adsorption front contains the normal paraffin depleted non-normal hydrocarbon vapors. With valves 74 and 89 open feed vapor from manifold conduit 73 continues into adsorber 75 and non-normal hydrocarbon vapors exit the other end through valve 89 passing through conduit 90, are cooled in heat exchanger 91 and separated from entrained, non-condensible gas in collector 92 from which non-normals hydrocarbon product is withdrawn through line 93 and gas is withdrawn from line 94. During this step the normal's adsorption front advances to 78% utilization of the bed leaving sufficient unused bed to adsorb the normal paraffins from the void space vapor during the following co-purge step. Valve 74 is closed and valve 96 opened and substantially one bed volume of purge from manifold 88 enters the adsorber effecting a forward displacement of the hydrocarbons in the voids. The normal paraffin hydrocarbons in the hydrocarbon vapor which are displaced in a co-current direction are adsorbed by the molecular sieve with a further forward advance of the normal's adsorption front to a point of 95 percent utilization of the fixed bed of molecular sieve and the normals depleted, non-normal hydrocarbon vapor is displaced co-currently from the adsorber.

When valve 74 was closed and valve 96 opened, the following valves associated with adsorber 95 were also changed. Valve 79 was closed terminating the countercurrent purge desorption step and valve 82 was opened starting the adsorption-fill step. Adsorber 75 has now completed the co-purge step and valves 96 and 89 are closed. Now valves 76 and 96 are opened for the countercurrent purge desorption step. At this point valves associated with adsorber 95 are changed. Valve 78 is closed and valve 81 opened. Recycle hydrogen gas from separator 97 passes through conduit 98 where it is mixed with added hydrogen gas fed in conduit 99 and valve 100, as required, passes into desorption purge gas recycle blower 101, is heated in heater 102 to the isothermal process temperature and thence into conduit 103 (which connects with manifold 77) through open valve 76 into and through adsorber 75 in a countercurrent direction, through open valve 96 into manifold conduit 88 through cooler 104 to separator 97. As the purge gas passes through the fixed bed of molecular sieve in adsorber 75 the adsorbed normal paraffins therein are at least partially desorbed therefrom and purged therefrom as a vapor mixture with the hydrogen gas stream from which they are condensed and collected in cooler 104 and separator 97. The product normal hydrocarbons are withdrawn through line 105. The process is essentially isobaric and isothermal. By this is meant that pressure gradients are those required to cause the various streams to flow as required for the process and the temperature changes within the adsorbers are those resulting from the latent heat of adsorption and desorption of the normal paraffins. These pressure gradients and temperature changes do not of themselves have any real effect on the adsorption loading or desorption unloading of the normal paraffins on the molecular sieve adsorbent although the pressure within the adsorbers may vary as much as plus or minus 15 p.s.i. from the average 215 p.s.i.g. and the temperature may vary as much as plus or minus 25° F. from the average of 700° F. in the above example.

What is claimed is:

1. Process for separating normal paraffins from admixture with non-normal hydrocarbons which comprises passing the mixture as a feedstock in the vapor phase into one end of a first fixed bed of particles comprising a zeolitic molecular sieve adsorbent having an effective pore diameter of about 5 angstroms and having adsorbed thereon a quantity of normal paraffin molecules, said first bed also containing a non-sorbable purge gas in its void space at substantially the same temperature and pressure as the incoming feedstock, said feedstock being passed into said first bed for a period of time sufficient to force the non-sorbable purge gas from the other end of said first bed and to adsorb normal paraffins on the molecular sieve therein; terminating the passage of feedstock into said bed prior to the time the stoichiometric point of the mass transfer zone of the lowest molecular weight normal paraffin sought to be isolated from the feedstock has moved through 85 percent of the bed length; isobarically and isothermally passing the non-sorbable purge gas forced from the first bed by the incoming feedstock thereto to at least one of a second and a third fixed bed, both of which have essentially the same adsorption capacity and void space as said first bed and contain particles comprising a zeolitic molecular sieve adsorbent having an effective pore diameter of substantially 5 angstroms and each of which contains a greater quantity than said first bed of adsorbed normal paraffin molecules from the feedstock at the time passage of said non-sorbable purge gas from said first bed is initiated; cocurrently purging non-normal hydrocarbons from the first bed void space with a non-sorbable purge gas; and desorbing at least some of the adsorbed normal paraffins from the first bed and recovering same.

2. Process according to claim 1 wherein said second bed contains hydrocarbons in its void space of essentially the same composition as the said feedstock as a result of a prior adsorption stroke, and said non-sorbable purge gas is passed into said second bed in a cocurrent direction with regard to the adsorption stroke in said second bed whereby void space non-normal hydrocarbons are forced out of said second bed.

3. Process according to claim 1 wherein said third bed is substantially free of non-normal hydrocarbons in its void space and said non-sorbable purge gas is passed into said third bed countercurrent to the direction of flow of the feedstock from which the normal hydrocarbons therein were adsorbed; simultaneously removing from said third bed cocurrent with the direction of flow of said non-sorbable purge gas a mixture of non-sorbable purge gas molecules and normal paraffin molecules and passing said mixture to said second bed which contains hydrocarbons in its void space of essentially the same composition as the said feedstock as a result of a prior adsorption stroke, said non-sorbable purge gas and normal paraffin mixture being passed into said second bed in a cocurrent direction with regard to the adsorption stroke in said second bed whereby void space non-normal hydrocarbons are forced out of said second bed.

References Cited
UNITED STATES PATENTS

| | | | |
|---|---|---|---|
| 3,451,924 | 6/1969 | Helfferich et al. | 208—310 |
| 3,201,490 | 8/1965 | Lacey et al. | 208—310 |
| 3,700,589 | 10/1972 | Symoniak et al. | 208—310 |

HERBERT LEVINE, Primary Examiner

U.S. Cl. X.R.

260—676 MS